UNITED STATES PATENT OFFICE.

EDGAR LEVINSTEIN, OF BOSTON, MASSACHUSETTS.

PROCESS OF VULCANIZATION.

1,406,197.  Specification of Letters Patent.  Patented Feb. 14, 1922.

No Drawing.  Application filed October 7, 1920. Serial No. 415,365.

*To all whom it may concern:*

Be it known that I, EDGAR LEVINSTEIN, a citizen of the United States, and a resident of Boston, county of Suffolk, and State of Massachusetts, have invented an Improvement in Processes of Vulcanization, of which the following description, in connection with the accompanying drawings, is a specification, like characters on the drawings representing like parts.

This invention relates to the vulcanization of rubber, using that word in a generic sense, by the action of sulphur.

In accordance with my invention I utilize as a vulcanizing agent a suitable substance which when heated with rubber at the temperatures at which vulcanizing is effected, will liberate sulphur in a nascent or active state and thus produce a rapid vulcanization. This substance may be either used as the sole vulcanizing agent or, preferably, in connection with ordinary sulphur, it then acting as what is called an accelerator, hastening the vulcanizing operation.

I utilize as a vulcanizing agent a suitable thiosulphate and preferably and as a specific example of my invention I utilize barium thiosulphate ($BaS_2O_3$).

Barium thiosulphate is a stable powder obtained by precipitating sodium or other soluble thiosulphates with barium chloride. I preferably utilize the same by mixing it in desirable proportions with ordinary sulphur and intimately mixing them with the crude rubber compound to be vulcanized. When the parts are heated at the usual vulcanizing temperatures the barium thiosulphate probably decomposes in accordance with the following formula: $6BaS_2O_3 = BaS + 2BaSO_3 + 3BaSO_4 + 6S$.

It will be seen that each molecule of the thiosulphate liberates one atom of sulphur which, being produced in a nascent or active state, produces a rapid vulcanization. The residue of barium sulphite, sulphate and sulphide is inert, non-volatile, and white in color, and is not only unobjectionable but constitutes for various purposes a desirable filling material for the finished rubber compound. The decomposition products do not injuriously affect the cured rubber and are non-poisonous, an advantage not present in certain of the organic compounds utilized at the present time as accelerators of vulcanization.

While the barium thiosulphate has the greatest advantages and is the best example of my invention, under certain circumstances when the resulting differences in action would be relatively unobjectionable, other thiosulphates may be used, particularly those of the alkaline earths such as strontium and calcium which bear a close analogy to barium.

Having thus described in detail the general scope of my invention, the principles exemplified thereby which I claim as new I shall express in the following claims.

Claims:

1. That process of vulcanization characterized by heating rubber with barium thiosulphate.

2. That process of vulcanization characterized by heating rubber with a thiosulphate salt of an alkaline earth.

3. That process of vulcanization which consists in intimately mixing crude rubber with a vulcanizing agent comprising barium thiosulphate and heating the same to produce a vulcanized compound combined with inert and stable filling material.

In testimony whereof, I have signed my name to this specification.

EDGAR LEVINSTEIN.